(12) United States Patent
Simpson et al.

(10) Patent No.: US 6,169,526 B1
(45) Date of Patent: Jan. 2, 2001

(54) SPACE-VARIANT BRIGHTNESS CONTROL SYSTEM FOR SEE-THROUGH DISPLAYS

(75) Inventors: Robert G. Simpson, Ellicott City; Richard A. Burne, Columbia, both of MD (US)

(73) Assignee: AlliedSignal Inc., Morristown, NJ (US)

( * ) Notice: Under 35 U.S.C. 154(b), the term of this patent shall be extended for 0 days.

(21) Appl. No.: 08/994,289

(22) Filed: Dec. 19, 1997

(51) Int. Cl.⁷ ................................................ G09G 5/00
(52) U.S. Cl. ............................ 345/8; 345/7; 345/207
(58) Field of Search ................................. 345/7, 8, 207

(56) References Cited

U.S. PATENT DOCUMENTS

| | | | |
|---|---|---|---|
| H1109 | 10/1992 | Roberts | 340/705 |
| 3,711,826 | 1/1973 | LaRussa | 340/27 |
| 3,816,005 | 6/1974 | Kirschner | 356/251 |
| 4,330,779 | 5/1982 | Wilensky et al. | 340/705 |
| 4,367,923 | 1/1983 | Ishikawa | 350/345 |
| 4,553,842 | * 11/1985 | Griffin | 356/375 |
| 4,740,780 | 4/1988 | Brown et al. | 340/705 |
| 4,847,603 | 7/1989 | Blanchard | 340/705 |
| 4,997,263 | * 3/1991 | Cohen et al. | 350/345 |
| 5,005,009 | 4/1991 | Roberts | 340/705 |
| 5,128,659 | 7/1992 | Roberts | 340/705 |
| 5,214,413 | * 5/1993 | Okabayashi et al. | 340/705 |
| 5,285,060 | 2/1994 | Larson et al. | 250/214 |
| 5,305,012 | 4/1994 | Farris | 345/7 |
| 5,343,313 | 8/1994 | Ferguson | 359/83 |

* cited by examiner

Primary Examiner—Richard A. Hjerpe
Assistant Examiner—Duc Q. Dinh
(74) Attorney, Agent, or Firm—Loria B. Yeadon

(57) ABSTRACT

The visibility of an image projected onto a background of spatially and temporally varying brightness can be optimized by dynamically adjusting the brightness of the projected image. The brightness of the background is detected on a zone-by-zone basis and the brightnesses of the corresponding portions of the projected image are adjusted accordingly.

6 Claims, 4 Drawing Sheets

OPTICAL LAYOUT FOR
SEPARATE DISPLAY AND IMAGING DEVICES

OPTICAL LAYOUT W/COMBINED DISPLAY AND IMAGING DEVICE

OPTICAL LAYOUT FOR
SEPARATE DISPLAY AND IMAGING DEVICES

SPACE-VARIANT BRIGHTNESS CONTROL SYSTEM FOR SEE-THROUGH DISPLAYS

BACKGROUND OF THE INVENTION

See-through displays such as head-up instrument displays, head- or helmet-mounted displays, and related devices allow the user to simultaneously view the physical world and an electronically-generated and optically projected image of text, graphics, or other video material. Brightness variations in the physical scene often make it difficult to achieve proper brightness in the projected image so that both the physical scene and the projected image are properly visible throughout the scene.

Consider for instance the situation where a pilot's field of view encompasses sunlit regions outside of the cockpit as well as more dimly illuminated regions within the cockpit. If the projected image overlays all of these regions, a single global adjustment of the projected image brightness will be inadequate. If such a global adjustment were set so that the projected image is visible against the bright portions of the physical scene, the dimmer portions of the physical scene will be very difficult to see, if not masked altogether. If, on the other hand, the projected image brightness is adjusted to provide adequate brightness against the dimly illuminated regions, the projected image will not be visible against the brightly-illuminated portions of the physical scene. An optimal solution requires that the brightness of each display pixel or zone be adjusted on the basis of the brightness of the corresponding portion of the physical scene or background. Since the brightness of the pixels or zones of the physical scene can vary dynamically across the entire scene, the brightness of the corresponding portions of the projected image must be adjusted in real time to account for such changes.

DESCRIPTION OF THE INVENTION

Figure 1:
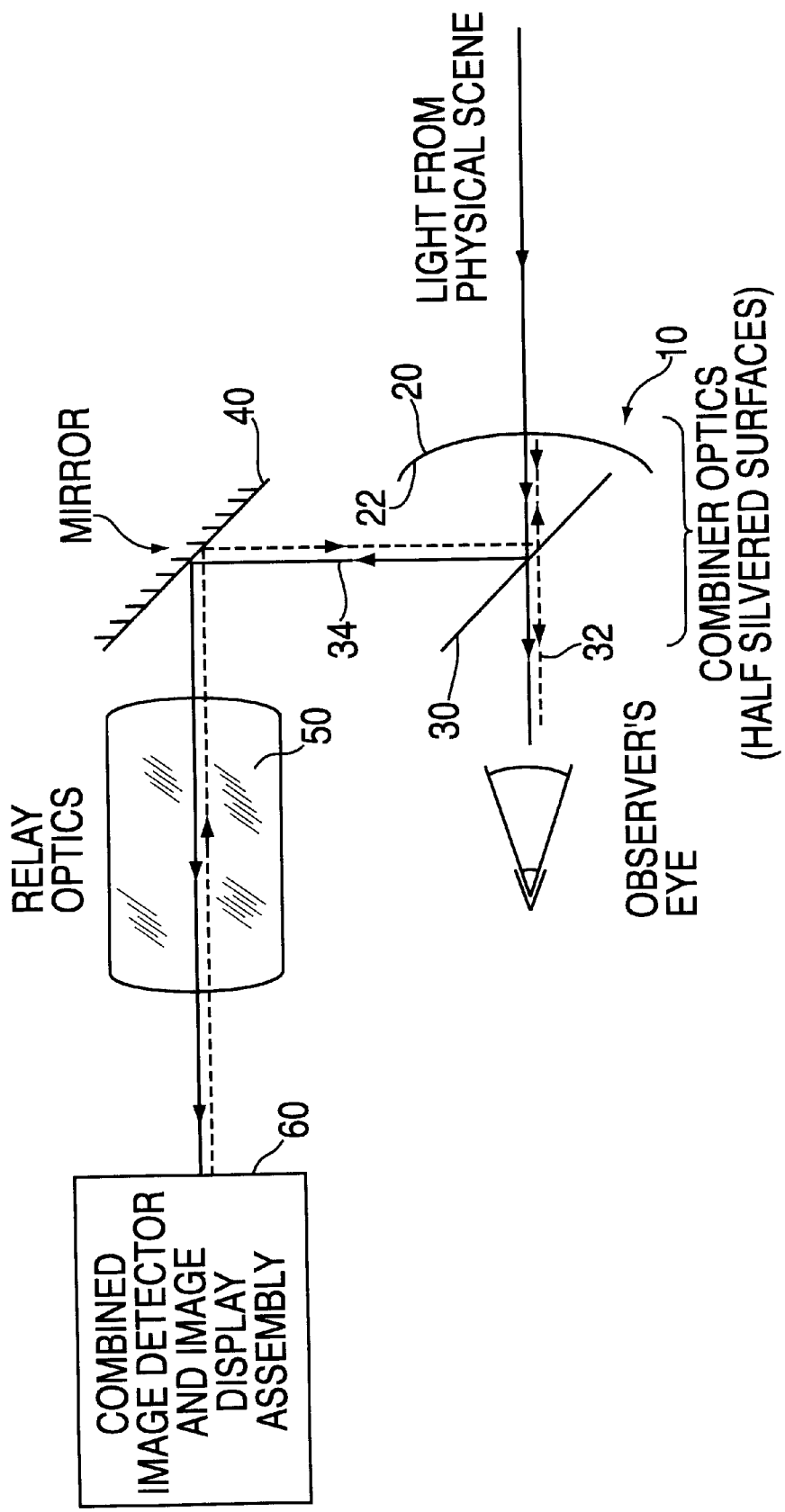
FIGS. 1 and 2 are diagrams of the optical paths of see-through displays.
Figure 2:
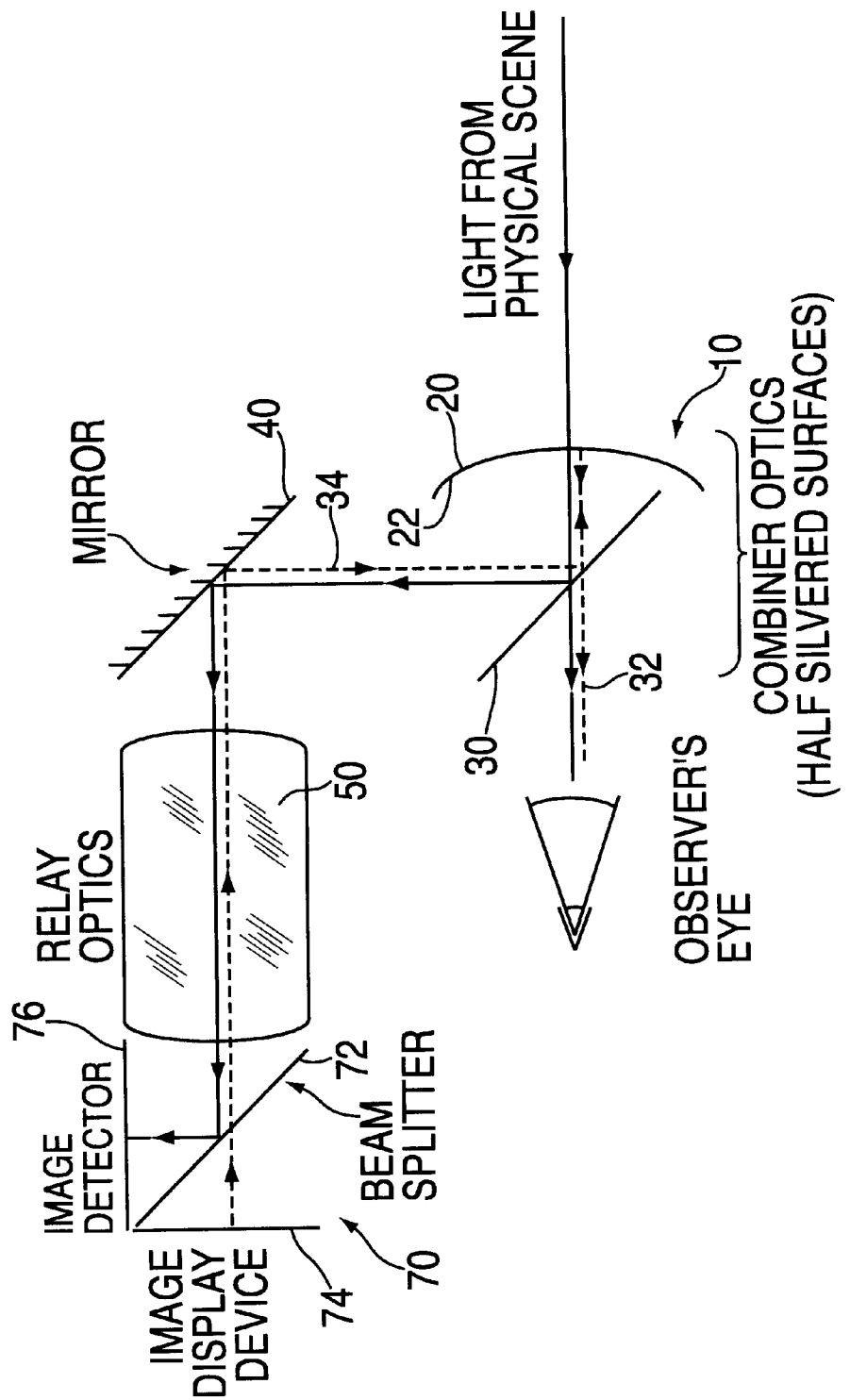

The optical paths for two arrangements for a see-through display are illustrated in FIGS. 1 and 2. In both figures, the observer views the outside physical scene (or some other background image) through a combiner optics assembly 10 having first and second partially-mirrored surfaces 20 and 30. The first surface 20 is oriented at right angles to the direction of light from the physical scene and, optionally, can be curved. The second surface 30 is flat and oriented at a 45° angle. The partially-mirrored surfaces 20 and 30 both partially reflect and partially pass light. The second surface 30 functions as a beam splitter, where light passes through the surface 30 on one axis 32 and is reflected by the surface on a reflective axis 34. Light emanating from the physical scene (depicted by the solid line) passes through the first surface 20 and travels to the angled second surface 30. The second surface 30 allows a portion or sample of this light to pass through and travel to the observer's eye, while the partial mirroring on the second surface 30 reflects the remaining portion of this light.

The light initially reflected by the second surface 30 travels upwardly (in the arrangement shown in the figures) to a fully-silvered mirror 40, which deflects the light towards a relay optics assembly 50. The relay optics assembly 50 passes the light to either a combined image detector and image display assembly 60 (FIG. 1) or a detector/display assembly 70 of discrete components (FIG. 2). The detector/display assembly 70 has a beam splitter 72, an image display device 74, and an image detector 76. The mirror 40 could be eliminated if the relay optics assembly 50 were coincident with the path of reflection from the second surface 30.

As shown by the solid line, a portion of the light emanating from the physical scene travels directly to the combined image detector and image display assembly 60 of FIG. 1. Simultaneously, the combined assembly 60 projects light containing an image in the opposite direction (depicted by the dashed line), which travels back through the relay optics assembly 50, after which it is deflected by the fully-silvered mirror 40 and again deflected by the second surface 30, until it reaches the first surface 20. There, the partial mirroring of the first surface 20 reflects a portion of the projected image back to the observer's eye, combining with light from the physical scene.

In FIG. 2, the beam splitter 72 deflects the light (from the physical scene, the solid line) towards the image detector 76. Simultaneously, the image display device 74 generates a projected image (depicted by the dashed line) which reaches the observer in the same fashion as the arrangement of FIG. 1.

The brightness of the projected image is controlled by the brightness of the physical scene. In the case of the arrangement of FIG. 1, the detector and image display device are integrated. Depending on the degree of control desired, individual detector elements can be provided for each emissive device or a detector element can be provided for a group of emissive devices proximate to the element on any desired ratio of detector elements to emissive devices, e.g., 1:2, 1:4, 1:16, etc. Alternatively, instead of pixels, the brightness can be sensed in quadrants, sectors, zones, or other convenient subdivisions of the display.

Figure 3:
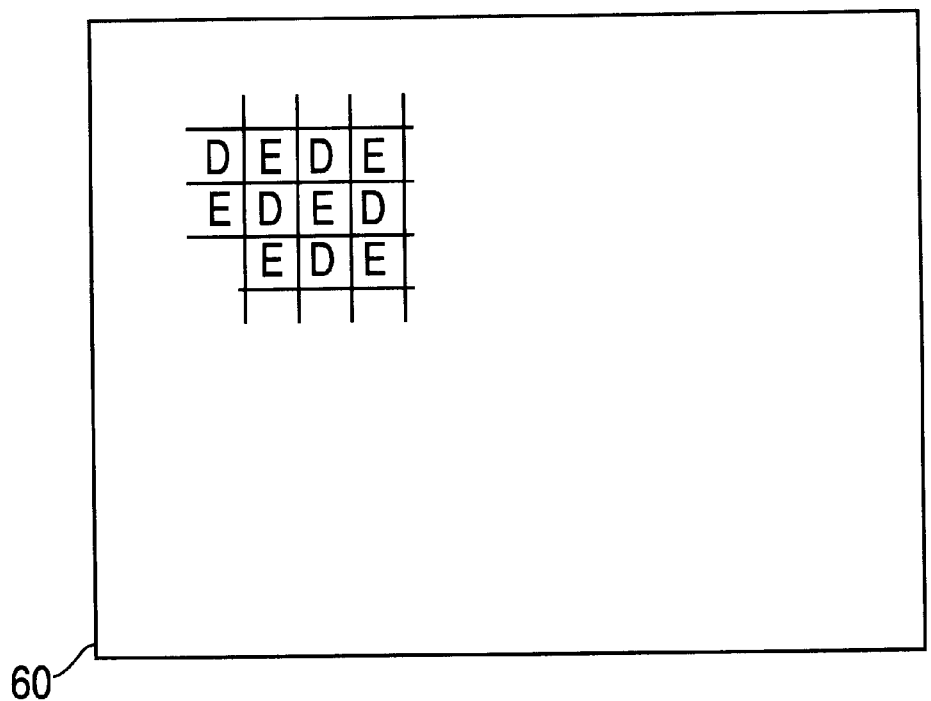
FIG. 3 is a diagram of a combined image display and detector assembly having alternating emissive and photodetector devices.

One arrangement for the combined image detector and image display assembly 60 of FIG. 1 is shown in FIG. 3. The assembly has alternating emissive (or emitter) and photodetector devices, denoted by the letters "E" and "D," respectively. Other deployments of emissive devices and photodetectors could be employed as will readily occur to those skilled in the art. The emissive devices can be electroluminescent, laser light emitting, or of another type as suits the application. Similarly, any suitable photodetector may be employed.

Figure 4:
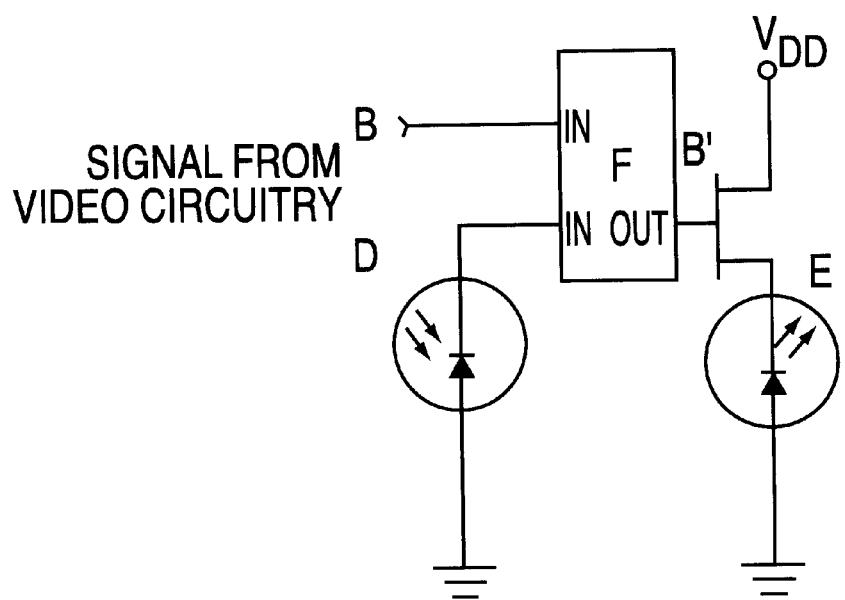
FIGS. 4 and 5 are schematic diagrams of circuits for controlling the brightness of a projected display.

The brightness of the light received by a photodetector is used to control the desired brightness of an adjacent emitter. The partial schematic of FIG. 4 shows how the devices can be interconnected for a single pixel. For clarity, the video control circuitry and addressing circuitry are omitted. Conventional circuitry may be employed here as suits the particular application.

The detector D receives light, causing it to generate a voltage proportional to the light's brightness, which it provides to an input of an algorithm F. The video control circuitry (not shown) provides a nominal brightness command B for the pixel, appropriate to the image that will be projected, to another input of the algorithm F. If the relationship between the input brightness B and the necessary output brightness B' is linear, then one might employ the following algorithm:

$$B'=B+kD$$

The constant k is adjusted to provide suitable performance. Other algorithms including non-linear relationships could be employed.

When the detector and the image display device are separated (FIG. 2), the output of the image detector 76 must be provided to the image display device 74. If the switching is fast enough, the detector output can be sent directly to the image display device 74, providing real time modification of the brightness level.

Figure 5:
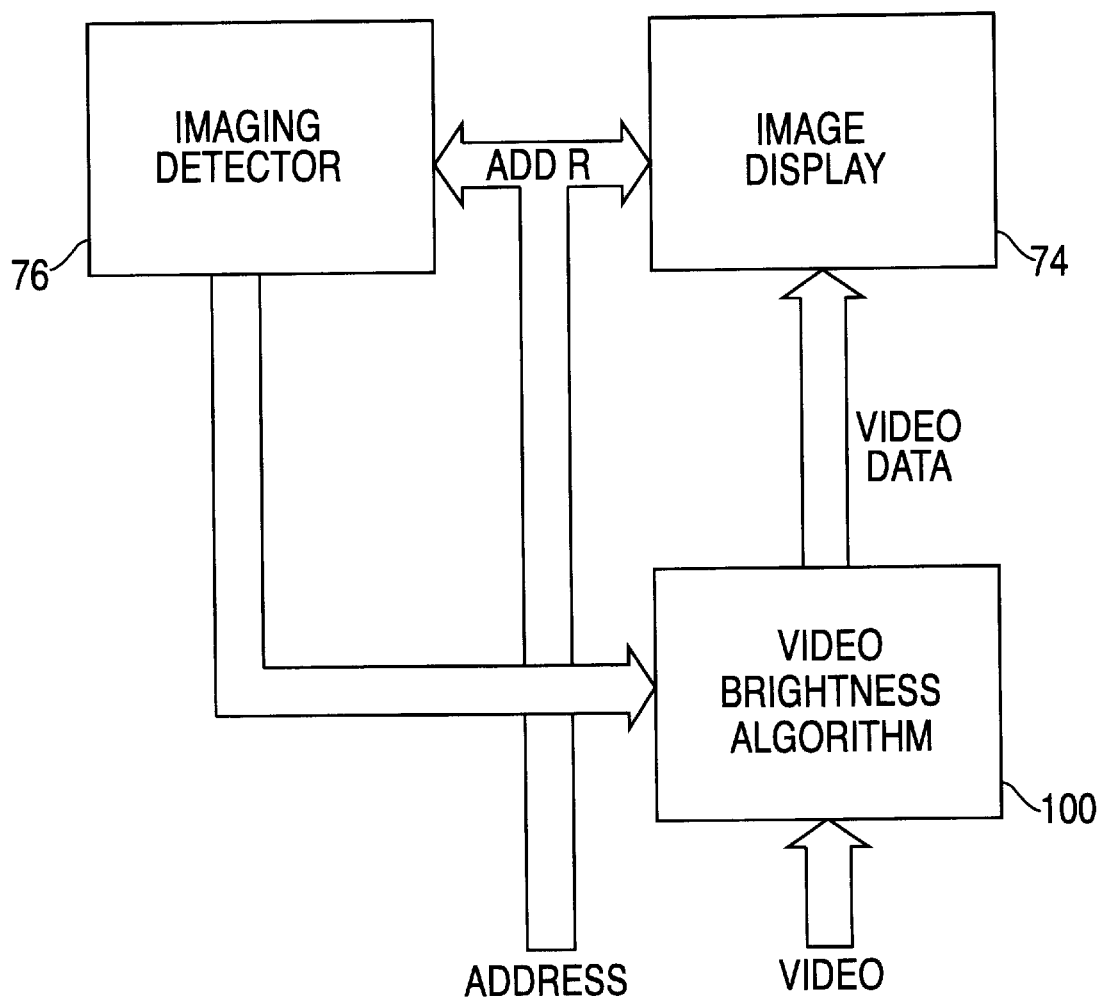

One arrangement for controlling the brightness of the image display device 74 is shown in the schematic diagram of FIG. 5. The video brightness information (and perhaps other information related to the video image) is provided to a video brightness algorithm 100. An address generator (not shown) provides raster scanning or other address information to both the image display device 74 and the image detector 76. Depending on the capabilities of the components, the algorithm 100 can use brightness information from the image detector 76 directly on a pixel-by-pixel basis. Alternatively, the brightness information from the detector 76 can be stored on frame-by-frame basis in a RAM and then read out one frame behind. As noted above, the resolution of the brightness information can be obtained on a quadrant or other basis. In such a case, the switching demands may be considerably lessened.

If the image only occupies a relatively small portion of the display, the process of adjusting the brightness could be limited to a subset of the background, perhaps with some margin to create a border.

What is claimed is:

1. An apparatus for controlling the brightness of an image projected onto a background comparing a plurality of spatial zones, said apparatus comprising:

means for detecting the brightness of individual ones of the spatial zones of the background, the means for detecting the brightness comprising an array of photodetectors and a beam splitter; and means, responsive to the detected brightness, for adjusting the brightness of the corresponding spatial zones of the projected image.

2. A see-through display including an apparatus for projecting an image onto a background comprising a plurality of spatial zones, said apparatus comprising:

means for detecting the brightness of individual ones of the spatial zones of the background;

means, responsive to the detected brightness, for adjusting the brightness of the corresponding zones of the projected image;

means for projecting the image whose brightness has been adjusted on a spatial basis onto the background; and means for directing a sample of the background to the means for detecting and directing the projected image onto the background, said means for directing a sample of the background and directing the projected image comprising a beam splitter.

3. An apparatus as set forth in claim 2, where the means for detecting the brightness comprises an array of photodetectors.

4. An apparatus for projecting an image onto a background comprising two or more spatial zones, comprising:

a combiner optics assembly comprising a partially-mirrored curved surface and a beam splitter located on an optical axis intersecting the background and a viewer, where the optical axis passes through the beam splitter; and an image detector and image display assembly located on the reflective optical axis of the beam splitter, where the image detector and image display assembly comprises an image detector and an image display responsive to the image detector.

5. An apparatus as set forth in claim 4, further comprising a relay optics assembly for conveying the sample of the background to the image detector and conveying the projected image from the image display to the beam splitter.

6. An apparatus as set forth in claim 4, where the image detector and image display assembly further comprises a second beam splitter.

* * * * *